United States Patent
Beckmann et al.

(10) Patent No.: US 9,537,947 B2
(45) Date of Patent: Jan. 3, 2017

(54) METHOD FOR OPERATING AN INTERNET-PROTOCOL-BASED FUNCTIONAL SYSTEM AND ASSOCIATED INTERNET-PROTOCOL-BASED FUNCTIONAL SYSTEM IN A VEHICLE

(71) Applicant: VOLKSWAGEN AG, Wolfsburg (DE)

(72) Inventors: Mark Beckmann, Braunschweig (DE); Lars Scholz, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 44 days.

(21) Appl. No.: 14/362,989

(22) PCT Filed: Nov. 29, 2012

(86) PCT No.: PCT/EP2012/073921
§ 371 (c)(1),
(2) Date: Jun. 5, 2014

(87) PCT Pub. No.: WO2013/083466
PCT Pub. Date: Jun. 13, 2013

(65) Prior Publication Data
US 2014/0334342 A1 Nov. 13, 2014

(30) Foreign Application Priority Data

Dec. 5, 2011 (DE) .................. 10 2011 120 249

(51) Int. Cl.
*H04L 29/08* (2006.01)
*H04L 29/12* (2006.01)
(Continued)

(52) U.S. Cl.
CPC ....... *H04L 67/1046* (2013.01); *H04L 41/0816* (2013.01); *H04L 61/2015* (2013.01);
(Continued)

(58) Field of Classification Search
CPC .......... H04L 2012/40273; H04L 67/02; H04W 4/046; H04W 88/16
See application file for complete search history.

(56) References Cited

U.S. PATENT DOCUMENTS 7,769,342 B2 * 8/2010 Tabe .................. H04M 1/6083
455/3.06
7,818,403 B2 * 10/2010 Alrabady ............... H04L 67/34
709/217

(Continued)

FOREIGN PATENT DOCUMENTS

DE 102009056203 A1 6/2011

OTHER PUBLICATIONS

Eichhorn et al.; "A flexible in-vehicle HMI architecture based on web technologies"; Proceedings of the 2nd International Workshop on Multimodal Interfaces for Automotive Applications; Feb. 7, 2010; pp. 9-12.

(Continued)

*Primary Examiner* — Alpus H Hsu
(74) *Attorney, Agent, or Firm* — Barnes & Thornburg LLP

(57) ABSTRACT

A method for operating an Internet-Protocol-based functional system in a vehicle with at least two system units separatably connected to one another in which a local IP address is respectively allocated to a first system unit and to a second system unit and data are transmitted between the first system unit and the second system unit with a reproduction rule for the purpose of carrying out a first function, wherein one of the system units acts as a transmitting system unit and the other system unit acts as a receiving system unit. The data are evaluated in the receiving system unit with the reproduction rule, the reproduction rule is used to refer to a memory location of a memory associated with the execution (Continued)

program code for the first function, and the first function is carried out via the receiving system unit using the data in the reproduction rule.

11 Claims, 3 Drawing Sheets

(51) Int. Cl.
    *H04L 12/24*     (2006.01)
    *G06F 15/16*     (2006.01)
    *H04W 4/04*     (2009.01)
    *H04W 88/16*     (2009.01)

(52) U.S. Cl.
    CPC .............. *H04L 67/02* (2013.01); *H04L 67/12* (2013.01); *H04W 4/046* (2013.01); *H04W 88/16* (2013.01)

(56) References Cited

U.S. PATENT DOCUMENTS

| | | | |
|---|---|---|---|
| 7,822,828 B2* | 10/2010 | Alrabady | H04L 67/06 709/217 |
| 7,849,224 B2* | 12/2010 | Alrabady | G07C 5/008 709/217 |
| 8,526,930 B2* | 9/2013 | Watkins | H04L 67/34 455/418 |
| 8,631,126 B2* | 1/2014 | Veiseh | G06F 17/30893 709/200 |
| 8,886,393 B2* | 11/2014 | Edwards | G07C 5/008 340/425.5 |
| 2005/0131595 A1 | 6/2005 | Luskin et al. | |
| 2006/0129553 A1 | 6/2006 | Simonds et al. | |
| 2007/0156311 A1 | 7/2007 | Elcock et al. | |
| 2009/0031418 A1 | 1/2009 | Matsuda et al. | |
| 2009/0172373 A1* | 7/2009 | Lopes | H04L 69/12 713/1 |
| 2009/0228959 A1* | 9/2009 | Veiseh | G06F 17/30893 726/4 |
| 2011/0010043 A1* | 1/2011 | Lafky | B60L 11/1842 701/31.4 |
| 2011/0106375 A1 | 5/2011 | Sundaram | |
| 2011/0154212 A1* | 6/2011 | Gharpure | G06F 17/30867 715/738 |
| 2011/0225259 A1* | 9/2011 | Quinn | G06F 8/65 709/217 |
| 2011/0289186 A1 | 11/2011 | Bell et al. | |

OTHER PUBLICATIONS

Eichhorn et al.; "A SOA-based middleware concept for in-vehicle service discovery and device integration"; Intelligent Vehicles Symposium (IV); Jun. 21, 2010; pp. 663-669.

Search Report for German Patent Application No. 10 2011 120 249.1; Jul. 4, 2012.

Search Report for International Patent Application No. PCT/EP2012/073921; Feb. 21, 2013.

* cited by examiner

METHOD FOR OPERATING AN INTERNET-PROTOCOL-BASED FUNCTIONAL SYSTEM AND ASSOCIATED INTERNET-PROTOCOL-BASED FUNCTIONAL SYSTEM IN A VEHICLE

PRIORITY CLAIM

This patent application is a U.S. National Phase of International Patent Application No. PCT/EP2012/073921, filed 29 Nov. 2012, which claims priority to German Patent Application No. 10 2011 120 249.1, filed 5 Dec. 2011, the disclosures of which are incorporated herein by reference in their entirety.

SUMMARY

Illustrative embodiments relate to a method for operating a functional system and an associated functional system in a vehicle, particularly information, communication and entertainment systems known as infotainment systems.

BRIEF DESCRIPTION OF THE DRAWINGS

The invention will now be explained in greater detail with reference to an exemplary embodiment, referring to the figures, in which.

DETAILED DESCRIPTION OF THE DISCLOSED EMBODIMENTS

Figure 1:
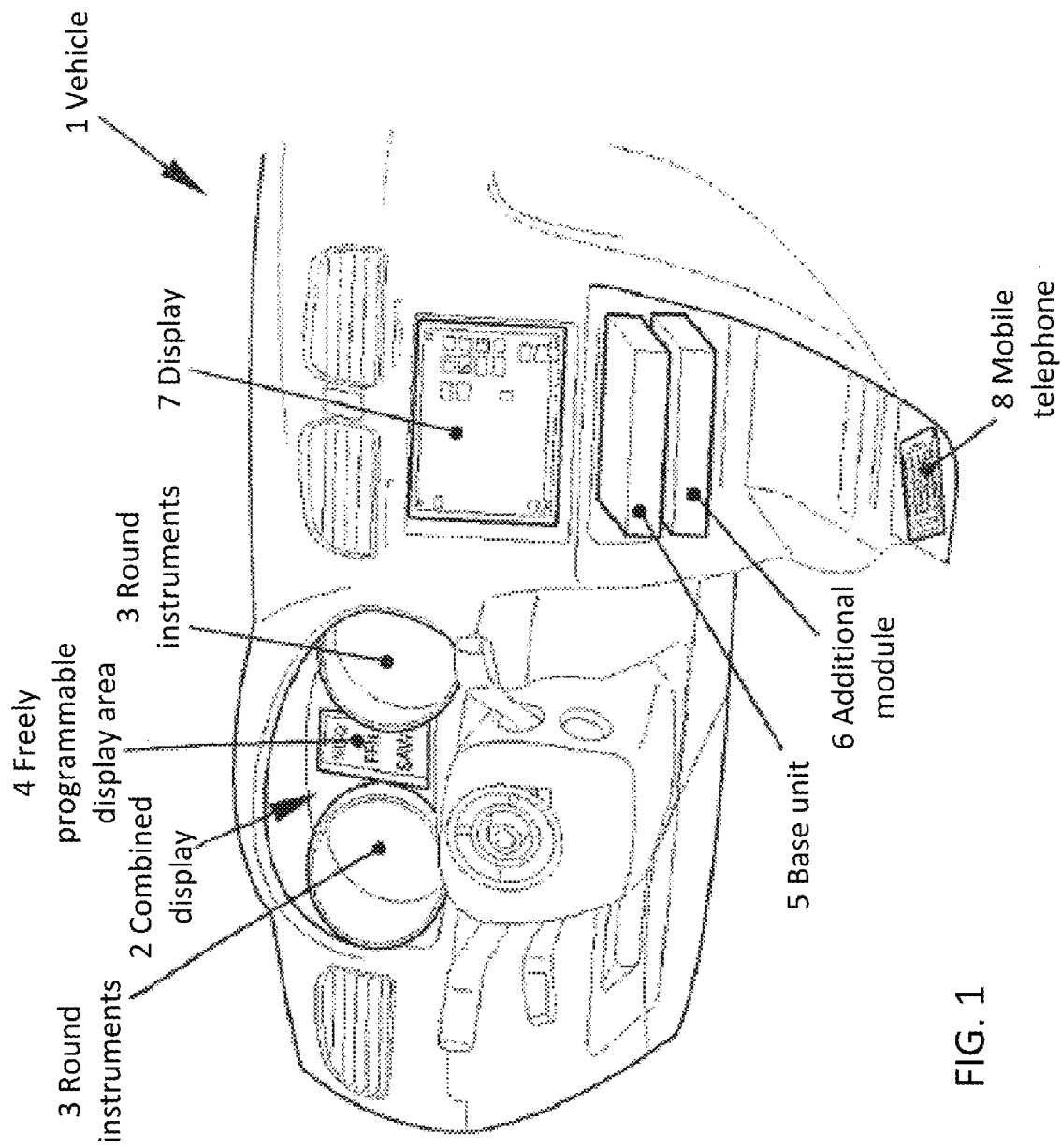
FIG. 1 shows the view of the cockpit of a vehicle comprising an infotainment system according to an exemplary embodiment, FIG. 2 diagrammatically shows the basic configuration of the infotainment system shown in FIG. 1, and FIG. 3 diagrammatically shows an example transmission of data comprising a reproduction rule for carrying out a first function between a first system unit and a second system unit via an IP protocol stack.

Disclosed embodiments provide a method for operating a functional system and an associated functional system in a vehicle which provide for flexible networking and utilization of functions between the individual system components and can be developed further cost-effectively.

The method for operating a functional system in a vehicle is an Internet-protocol-(IP-)based functional system having at least two system units which are connected to one another in a separable manner. In the method, a local IP address is respectively allocated to a first system unit and to a second system unit. Data are transmitted between the first system unit and the second system unit with a reproduction rule 30 for the purpose of carrying out a first function, wherein one of the system units acts as transmitting system unit and the other system unit acts as receiving system unit. The data are evaluated in the receiving system unit with the reproduction rule 30. The reproduction rule 30 is used to refer to a memory location of a memory associated with the execution program code for the first function and the first function is carried out via the receiving system unit using the data in the reproduction rule 30. Defining the interface by means of the Internet protocol, especially by means of the entire IP protocol stack, enables arbitrary Internet-capable communication and information devices to be flexibly linked in. The development cycles of relevant functional systems thus no longer need to be coupled to the development cycles of the vehicle. In addition, the vehicle functional system can be extended in a scalable manner with external devices without elaborate integration.

The system units connected releasably to one another have a data link which is deactivatable and/or physically separable. In particular, they are system units which are separately upgradable and are not integrated in a device. The system units can be arranged permanently in the vehicle or connected detachably to the vehicle. A particular advantage is obtained when at least one of the system units is a mobile terminal.

In at least one disclosed embodiment, the first system unit is connected to the vehicle via a vehicle interface with respect to data and the first executable function accesses data stored in the vehicle. The first system unit takes over the role of a gateway in this case and can thus render the entire internal data world of the vehicle externally available to the other system units. In the disclosed embodiments, data stored in the vehicle are data which are not directly accessible in the first system unit by the IP-based functional vehicle system, with the exception of the gateway, e.g., data for engine control. Changes within the vehicle can be mapped in the first system unit in such a manner that they are not visible to other system units toward the outside or, respectively, that the interoperability is still possible. The development of other system units can thus take place independently of the vehicle development.

According to at least one disclosed embodiment, it is provided in this context that in the first system unit, an access profile is stored by means of which access criteria for further system units are stored with respect to the data stored in the vehicle and the first system unit checks whether one of the further system units is access-authorized with respect to certain data stored in the vehicle. By this means, a restricted access for mobile terminals brought along or devices connected detachably in the vehicle to internal vehicle data can be controlled.

In a further disclosed embodiment, the local IP addresses are assigned by means of the first system unit. The first system unit acts as network data server. It is then configured particularly as base unit of the functional system. An aggregation of important IP network functions in a base device has the advantage that these functions are not necessary in the other, possibly mobile terminals. This may have cost advantages.

In at least one disclosed embodiment, the reproduction rule 30 for carrying out the first function is specified in accordance with a standardized format, optionally Java Script, HTML or HTML5 or similar formats. This facilitates the linking of Internet-capable standard devices. A standardized format is specified in such a manner that the range of functions which is transferred in the data of the reproduction rule 30 can run as intended without previous system integration. HTML5 and GSS (Generic Security Services) have been optimized for the task of not sending the data themselves for an execution of a function but only their reproduction rule 30.

In at least one disclosed embodiment, the execution program code belonging to the first function is stored outside the vehicle and the vehicle system accesses the execution program via a wireless data link. The execution program is stored, in particular, in the Internet. Internet services can thus be reproduced via an arbitrary system unit.

Optionally, the execution program may be stored in one of the system units of the functional system or another memory location in the vehicle.

In at least one disclosed embodiment, several functions are executed simultaneously or successively in the vehicle system, wherein the first and the second system unit are designed to act as transmitting system unit for the first function and as receiving system unit for the second function. By this means, the role of server and client can be exchanged. Depending on the desired function implementation, the reproduction medium can be reset flexibly for each function to be executed. For example, a function installed on a mobile computer brought along can be output via an output device arranged permanently in the vehicle.

In a further disclosed embodiment, at least three system units are connected separately to one another in the vehicle system and one of the system units forwards IP data packets between two other system units. This system unit then acts as router. The network architecture can thus be flexibilized. The individual system units do not need to be star-connected to a base unit. This allows specialization of individual system units as a result of which the vehicle system may become more cost-effective at the same functionality.

The Internet-protocol-(IP-)based functional system in a vehicle comprises at least one first system unit and one second system unit which are connected separately to one another, and a network configuration server by means of which a local IP address can be assigned in each case to the first system unit and to the second system unit. In this context, data with a reproduction rule 30 for carrying out a first function can be transmitted between the first system unit and the second system unit, wherein one of the system units acts as transmitting system unit and the other system unit acts as receiving system unit. Furthermore, the data can be evaluated in the receiving system unit with the reproduction rule 30, by means of the data of the reproduction rule 30 it is possible to refer to a memory location of a memory which is allocated to the execution program code of the first function and by means of the data with a reproduction rule 30, the first function can be carried out via the receiving system unit. The functional system is particularly suitable for carrying out the disclosed method. It also has the advantages of the disclosed method.

In particular, the functional system is an infotainment system with a base unit permanently connected in the vehicle and at least one releasably connected mobile terminal. If the functional system can send out or receive data with a reproduction rule 30 via the IP protocol stack, functional systems having a different range of functions are also comprised, e.g. comfort systems with peripheral system units and, for example, a graphical operating interface.

FIG. 1 represents the view of the cockpit of a vehicle (without representing the steering wheel) comprising an infotainment system according to an exemplary embodiment. The infotainment system utilizes the combined display 2 of the vehicle 1 for outputting various infotainment contents. In this context, these can be displayed on a freely programmable display area 4 between the round instruments 3.

The infotainment system comprises a base unit 5 and an additional module 6 which are installed permanently in the lower area of the center console of the vehicle. In the upper area of the center console, a display 7 is or can be arranged. This can be optionally a permanently installed multifunction display or a detachably connected display which belongs, for example, to a flat screen computer, a so-called tablet PC. For this purpose, a device holder, a so-called cradle, into which the mobile device can be mechanically locked, suitable for the mobile display or the mobile flat screen computer can be provided in the center console. The infotainment system comprises another device holder or coupling box for a mobile telephone 8 in the lower area of the center console.

Figure 2:
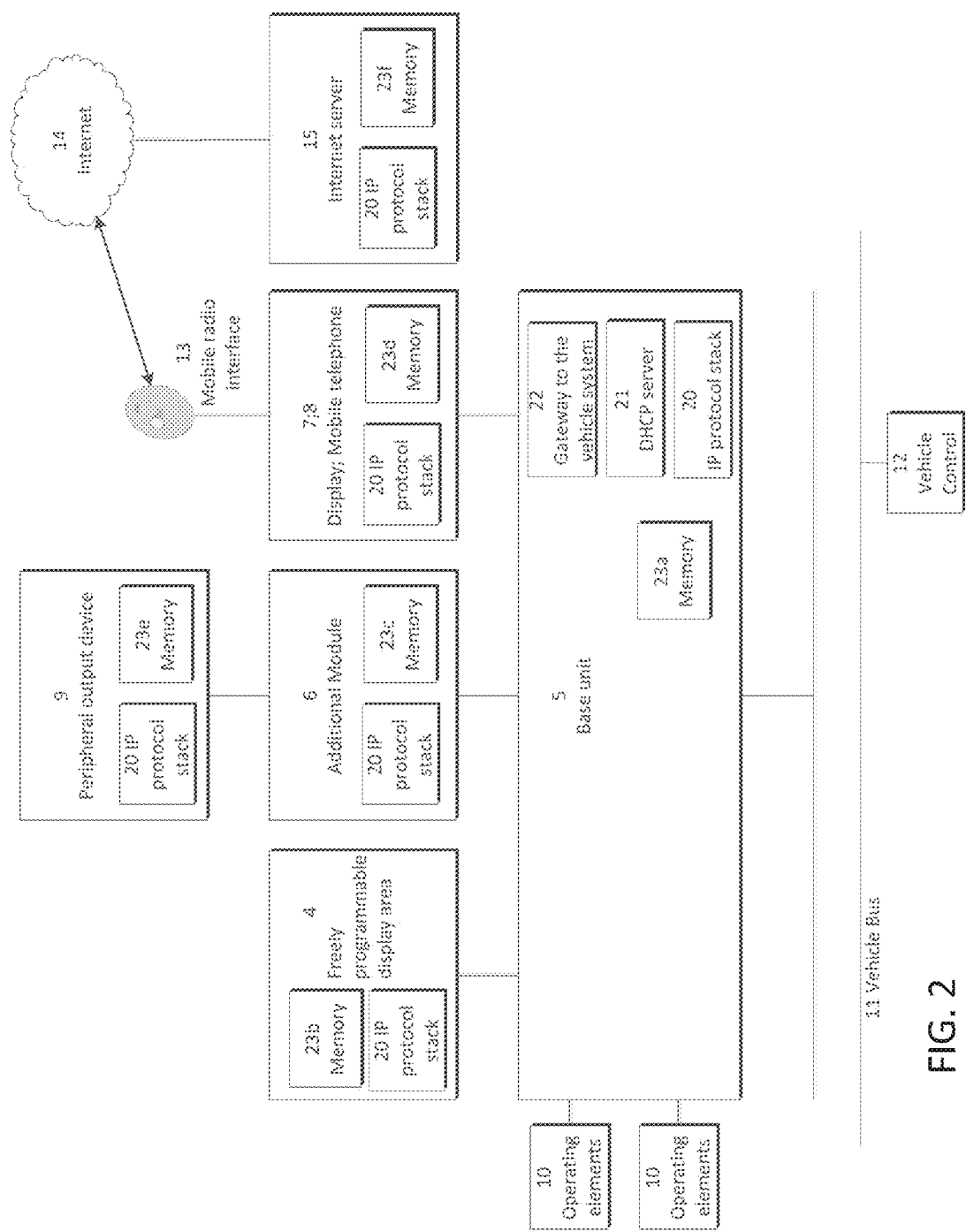
Figure 3:
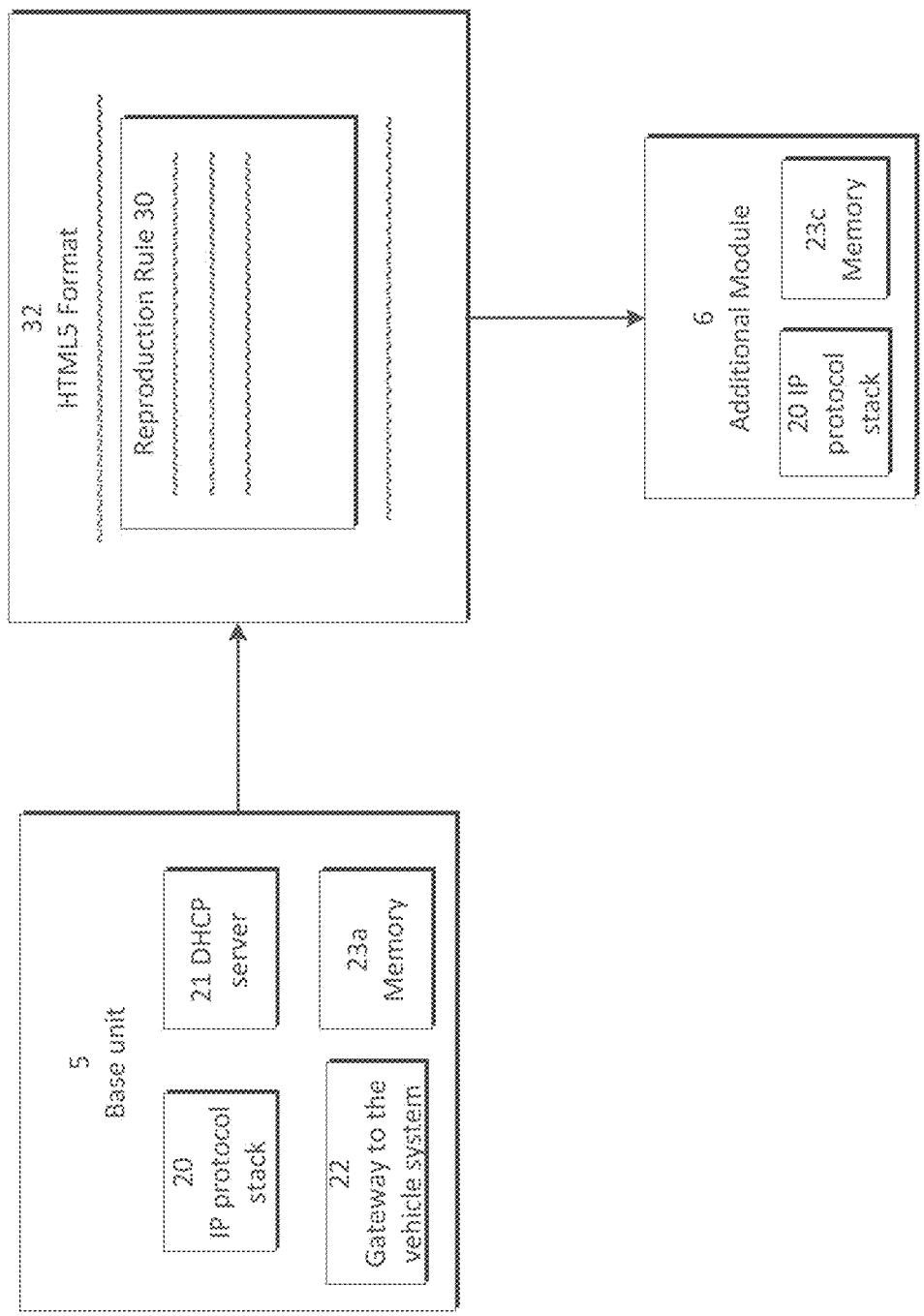

The basic diagrammatic configuration of the infotainment system is shown in FIG. 2. The base unit 5 is connected to various operating elements 10 permanently installed in the vehicle 1. The operating elements 10 are, e.g., pushbutton switches and rotary reset controls, arranged at or in the vicinity of the center console, for operating the vehicle functions. The base unit 5 is also connected to the vehicle control 12 via the vehicle bus 11. The base unit 5 can thus access vehicle data and vehicle functions in a controlled manner. The vehicle data comprise, for example, user information such as, e.g., an electronic logbook, data for engine control and operating information and associated control programs of the vehicle comfort system.

The base unit 5 is connected to various other system units of the infotainment system. The base unit 5 accesses the freely programmable display area 4 via a line run in the dashboard of the vehicle 1 and, in doing so can control the display contents in the display area 4. The base unit 5 is also connected to the additional module 6. The additional module 6 comprises a multimedia processor and provides various multimedia functions. In this context, the additional module 6 comprises various drives and interfaces for accommodating multimedia data media which can be output via the multimedia functions. In particular, the additional module 6 comprises a CD player and one or more connections for connecting a peripheral output device 9.

The connections between the base unit 5, on the one hand, and the additional module 6, the tablet PC with its associated display 7 and the mobile telephone 8, on the other hand, can be implemented in various manners. On the one hand, contacts or interfaces can be provided in the relevant holders via which the relevant device mounted in the holder can set up a wire-connected data link to the base unit 5. On the other hand, the connections can also be designed to be wireless. The additional module 6 and the tablet PC establish a connection to the base unit 5, e.g., via an interface according to the Bluetooth or WLAN standard (WLAN=Wireless Local Area Network). When it is inserted into the coupling box provided for this purpose, the mobile telephone 8 connects itself automatically to the coupling box via the NFC technology (NFC=Near Field Communication) which, in turn, is connected to the base unit 5.

The mobile telephone 8 is equipped with a standard mobile radio interface 13, for example according to the UMTS standard, and can set up a wireless link to Internet servers 15 in the Internet 14. Thus, data and execution program code of execution programs can be accessed outside the vehicle 1 via the mobile telephone 8.

The infotainment system is IP-based, i.e., its system units 4-9 can exchange data with one another via the Internet protocol IP. For this purpose, in each of the system units 4-9 the IP protocol stack 20 is installed, which is also installed in the Internet server 15. In this context, the IP protocol stack 20 provides that, according to the OSI reference model of telecommunication, the network layer operates in accordance with the IP protocol and the transport layer operates in accordance with the TCP or the UDP protocol. To represent application contents, the HTML5 format 32 is provided which contains a reproduction rule 30 for carrying out and representing functions, for example for outputting multimedia contents.

The system units 4-9 and the Internet server 15 in each case have the memory 23a-23f which provides a memory location which can be allocated to the execution program code of various executable functions.

For this purpose, a DHCP (Dynamic Host Configuration Server) server 21 is integrated in the base unit 5, with the aid of which server local IP addresses can be assigned dynamically to the other system units 4 and 6-9 and also to the base unit 5 itself. By means of the assigned IP addresses, the system units 4-9 can be mutually addressed and can send out or receive reproduction rules 30 according to HTML5 to another system unit as transmitting and/or as receiving system unit. In this context, data stored in the infotainment system can form a vehicle intranet.

Due to the changeable role conditions, a system unit 4-9 can thus act in principle once as server and another time as client. When several functions are executed at the same time, a system unit 4-9 can act as server for one function and as client for the other function. In this manner, the functions can be output via the device which is most suitable for this purpose. In this context, peripheral output devices 9 can also receive IP data with a HTML5 reproduction rule 30 via, e.g., the additional module 6 or the base unit 5, the additional module 6 or the base unit 5 in this case serving as router, only the IP data being forwarded and the information of the higher protocol layers, particularly the reproduction rule 30 according to HTML5, remaining unobserved.

To prevent an uncontrolled access from the system units 4-9 or even from the Internet 14, a gateway 22 is integrated in the base unit 5. In the gateway 22, an access profile is stored by means of which access criteria are stored for the further system units, especially the detachably connected mobile devices 7 and 8 with respect to the data 12 stored in the vehicle 1. The gateway 22 checks whether the respective mobile device 7 or 8 is access-authorized with respect to certain data 12 stored in the vehicle 1. If one of the system units 4-9, particularly a detachably connected device 7 or 8, acts as server for a function and wants to access data 12 stored in the vehicle 1 for this function, these data are procured via the gateway 22. For this purpose, the data are requested by the gateway 22 via the vehicle bus 11 and stored in the integrated memory 23a within the base unit 5.

The reproduction rule 30 for carrying out a function contains an intranet or Internet link which points to a data source addressable via the IP protocol, which is allocated to the execution program code of this function. This data source is located, for example, at a memory location of one of the memories 23a-23f. The receiving system unit evaluates the reproduction rule 30 and outputs the function in accordance with the reproduction rule 30.

In at least one disclosed embodiment of the infotainment system, the radio functionality is implemented in the base unit 5. Here, the frequency tuner and the audio technology, e.g. an audio amplifier and the connection to the loudspeakers are provided. For this application, the display 7 of the tablet PC serves as display device for parts of the radio functionality which can be output visually in that the operating menu for adjusting the radio and visual information about the radio program are displayed on the display 7. In this case, the base unit 5 handles the role of server and the display 7 handles the role of client.

The base unit 5 comprises optionally its own display (not shown) and accesses functions of the mobile telephone 9. The display contents are now output via the display of the base unit 5. In this case, the base unit is the client and the mobile telephone is the server. In this context, the function called up can be linked itself with a data source in the Internet 14, e.g. an application on the Internet server 15.

The possible applications are not restricted to the exemplary applications mentioned. For example, sessions for a secured remote access, also known a Virtual Private Networking (VCN) can be terminated via the mobile radio link 13 in the vehicle 1. In this context, it is insignificant for the abovementioned reasons which of the system units 4-9 will handle which role since, in principle, these can be interchanged and only depend on the special design of the relevant system unit and the given suitability. Furthermore, other standardized or proprietary technologies can also be used optionally for linking mobile devices in the vehicle if they can be transmitted by means of the IP protocol stack 20. Furthermore, the system units are not restricted to the cockpit. The infotainment system comprises, for example, displays arranged in the rears of the front seats, or mobile terminals via which the passengers in the body of the vehicle 1 can utilize the infotainment system.

The number of functional systems in the vehicle has continuously increased in recent years. In the case of infotainment facilities, for example, it is not only the variety of functions which has greatly increased but an increasing number of devices are also included in the information architecture. Thus, display contents can be displayed on different displays as required or audio contents can be reproduced over different audio channels.

It is also known to mount portable or mobile electronic devices detachably in a vehicle and to couple them to other facilities of the vehicle. For example, hands-free facilities for mobile telephones are known in which the mobile telephone is accommodated by a mechanical holder and is connected to the vehicle by means of a plug in such a manner that during the telephoning, a microphone accommodated in the internal space of the vehicle and the loudspeakers of the vehicle can be utilized. Furthermore, there are concepts for detachable navigation devices in the vehicle with the aid of which navigation functions can be flexibly retrofitted.

However, coupling devices brought along in the vehicle is not restricted to communication solutions and driver assistance systems. Furthermore, various solutions have been specified for also coupling reproduction devices of entertainment electronics to the vehicle facilities.

When the individual devices are networked together, there must be, on the one hand, a high effort of integration via proprietary interfaces and, on the other hand, the development of the relevant hardware and software components is coupled to the development cycles of the respective vehicle development. In particular, it is not possible to profit from the very short innovation cycles of the information and communication industry. Furthermore, it is disadvantageous that external devices brought along are dependent on the range of functionality of the controlling functional unit in the vehicle and thus, as a rule, only a small degree of the range of functions and the depth of functions can be used in the vehicle environment.

LIST OF REFERENCE DESIGNATIONS

1 Vehicle
2 Combined display
3 Round instruments
4 Freely programmable display area
5 Base unit
6 Additional module
7 Display
8 Mobile telephone
9 Peripheral output device
10 Operating elements 11 Vehicle bus
12 Vehicle control
13 Mobile radio interface
14 Internet
15 Internet server
20 IP protocol stack
21 DHCP server
22 Gateway to the vehicle system
23a-f Memories
30 Reproduction Rule

The invention claimed is:

1. A method for operating an Internet-protocol-(IP-)based functional system in a vehicle with at least two system units which are separably connected to one another, the method comprising a first system unit of the at least two system units:
respectively allocating a local IP address to each of the first system unit and a second system unit of the at least two system units to enable Internet-capable communication between the first system unit and the second system unit,
transmitting data comprising a reproduction rule for carrying out a first function between the first system unit and the second system unit via an IP protocol stack, wherein the first system unit acts as a transmitting system unit and the second system unit acts as a receiving system unit,
acting as a receiving system unit evaluating the data in the receiving system unit using the reproduction rule,
using the reproduction rule to refer to a memory location of a memory associated with an execution program code to perform the first function at the receiving system unit,
performing the first function by the receiving system unit using reference information in the reproduction rule, and
specifying the reproduction rule for carrying out the first function in accordance with a standardized format,
wherein the standardized format is specified such that a range of functions which is transferred using the reference information in the reproduction rule can run without previous system integration.

2. The method of claim 1, wherein the first system unit is connected to the vehicle via a vehicle interface, and the first function accesses data stored in the vehicle.

3. The method of claim 2, further comprising,
storing, in the first system unit, an access profile;
using the stored access profile to access criteria for further system units of the at least two system units with respect to the data stored in the vehicle, and
checking by the first system unit whether one of the further system units is access-authorized with respect to certain data stored in the vehicle.

4. The method of claim 1, further comprising assigning the local IP addresses by the first system unit.

5. The method of claim 1, further comprising storing the execution program code belonging to the first function outside the vehicle, and accessing an execution program by the Internet-protocol-(IP)based functional system via a wireless data link.

6. The method of claim 1,
wherein several functions are executed simultaneously or successively in the Internet-protocol-(IP)based functional system,
wherein the first system unit acts as the transmitting system unit and the second system unit acts as the receiving system unit for the first function, and
wherein the first system unit acts as the receiving system unit and the second system unit acts as the transmitting system unit for a second function.

7. The method of claim 1, wherein
at least three system units are connected separably to one another in the Internet-protocol-(IP)based functional system, and
one of the at least three system units forwards IP data packets between two other system units.

8. The method of claim 1, wherein the reproduction rule for carrying out the first function is specified in accordance with Hyper Text Markup Language format.

9. The method of claim 1, wherein the reproduction rule for carrying out the first function is specified in accordance with Hyper Text Markup Language 5 format.

10. An Internet-protocol-(IP-)based functional system in a vehicle, the system comprising:
a first system unit of at least two system units and a second system unit of the at least two system units which are connected separably to one another; and
a network configuration server to assign a local IP address to each of the first system unit and to the second system unit,
wherein data comprising a reproduction rule for carrying out a first function can be transmitted between the first system unit and the second system unit via an IP protocol stack, wherein the first system units acts as a transmitting system unit and the second system unit acts as a receiving system unit,
wherein the data is evaluated in the receiving system unit with the reproduction rule to refer to a memory location of a memory which is allocated to the execution program code of the first function to carry out the first function via the receiving system unit,
wherein the reproduction rule for carrying out the first function is specified in accordance with a standardized format, and
wherein the standardized format is specified such that a range of functions which is transferred using the reference information in the reproduction rule can run without previous system integration.

11. The functional system of claim 10, wherein the functional system is an infotainment system with a base unit permanently connected in the vehicle and at least one releasably connected mobile terminal.

* * * * *